United States Patent [19]
Hahn et al.

[11] 4,446,253
[45] May 1, 1984

[54] PRODUCTION OF FINE-CELLED FOAMS FROM STYRENE POLYMERS

[75] Inventors: Klaus Hahn, Kirchheim; Heinz Weber, Gruenstadt; Wolfgang Guenther, Ludwigshafen; Bernhard Schillinger, Mannheim; Reinhold Weber, Mutterstadt, all of Fed. Rep. of Germany

[73] Assignee: BASF Aktiengesellschaft, Fed. Rep. of Germany

[21] Appl. No.: 401,347

[22] Filed: Jul. 23, 1982

[30] Foreign Application Priority Data

Aug. 7, 1981 [DE] Fed. Rep. of Germany ....... 3131446

[51] Int. Cl.$^3$ ................................................ C08J 9/00
[52] U.S. Cl. ............................. 521/79; 264/DIG. 5; 521/91; 521/92; 521/146; 521/908; 521/93
[58] Field of Search ....................... 521/79, 91, 92, 93, 521/908

[56] References Cited

U.S. PATENT DOCUMENTS 2,576,977  12/1951  Stober ................................. 521/79
2,577,743  12/1951  De Long ............................. 521/79
3,026,272   3/1962  Rubens et al. ..................... 521/79
3,072,584   1/1963  Karpovich .......................... 521/79
4,085,073   4/1978  Suh .................................... 521/79
4,289,857   9/1981  Hoki et al. ......................... 521/79

Primary Examiner—Morton Foelak
Attorney, Agent, or Firm—Keil & Witherspoon

[57] ABSTRACT

Fine-celled foams are produced by a process in which a styrene polymer is melted, the melt is mixed with a volatile blowing agent and a nucleating agent under superatmospheric pressure, the mixture is let down to atmospheric pressure, and the foam is cooled. The nucleating agent employed comprises from 0.02 to 2% by weight of the calcium salt of a long-chain fatty acid, and from 0.01 to 1% by weight of a finely divided, inorganic substance which is insoluble in the styrene polymer, a mixture of calcium stearate and magnesium oxide being preferred.

4 Claims, No Drawings

PRODUCTION OF FINE-CELLED FOAMS FROM STYRENE POLYMERS

In a conventional process for producing styrene polymer foams, the plastic is melted in an extruder, the melt is mixed with a volatile blowing agent, the mixture is extruded into the surrounding atmosphere, and the product obtained is cooled. A nucleating agent is added to the styrene polymer in order to achieve a fine, uniform cell structure.

U.S. Pat. No. 2,577,743 discloses that from 0.04 to 1% of a metal stearate is added to improve the foaming characteristics and the cell structure of extruded polystyrene foams. It has been found that barium stearate is a highly effective nucleating agent, but its toxicity makes it necessary to employ special safety measures when it is handled. Although calcium stearate is non-toxic, it is not sufficiently effective as a nucleating agent.

It is an object of the present invention to provide a highly effective, non-toxic nucleating agent.

We have found that this object is achieved by a combination of a calcium salt of a long-chain fatty acid, and a finely divided, inorganic substance which is insoluble in the styrene polymer. Accordingly, the present invention relates to a process for the production of a foam by melting a styrene polymer, mixing the melt with a volatile blowing agent and a nucleating agent under superatmospheric pressure, letting the mixture down to atmospheric pressure, and cooling the foam, wherein from 0.02 to 2% by weight of the calcium salt of a long-chain fatty acid, and from 0.01 to 1% by weight of a finely divided, inorganic substance which is insoluble in the styrene polymer, are employed as the nucleating agent.

Suitable styrene polymers are polystyrene, copolymers of styrene with not more than 50% by weight of comonomers, eg. α-methylstyrene, acrylonitrile, acrylates or methacrylates, and polystyrene made impact-resistant with rubbers.

Suitable blowing agents are aliphatic hydrocarbons, eg. butane, pentane and hexane, and in particular those which dissolve in the polymer only under pressure, eg. methyl chloride, fluorochlorohydrocarbons and carbon dioxide. Mixtures of blowing agents may also be employed. The amount of blowing agent is preferably from 5 to 20, in particular from 8 to 15, % by weight, based on the styrene polymer.

One component of the nucleating agent is a calcium salt of a long-chain fatty acid, preferably one of 10 to 20 carbon atoms. Calcium stearate is preferred, but calcium laurate is also suitable. This component is employed in an amount of from 0.02 to 2, preferably from 0.05 to 1, % by weight, based on the styrene polymer.

The other component is a finely divided, inorganic substance which is insoluble in the styrene polymer and has a mean particle size preferably of 0.01–200 μm, in particular of 1–100 μm. Oxides and silicates are preferred, and oxides of divalent and trivalent metals, eg. magnesium oxide, zonc oxide and aluminum oxide, silicates, eg. talc, carbonates, eg. chalk, and silica are particularly suitable. The silicates are employed in amounts of from 0.01 to 1, preferably from 0.05 to 0.5, % by weight, based on the styrene polymer.

In addition, conventional assistants, eg. flameproofing agents, flameproofing synergists, dyes and fillers, may also be employed.

To produce the foam, the styrene polymer is melted, and the melt is mixed with the blowing agent and the nucleating agent, with or without further additives, to give a homogeneous mixture. Mixing is conventionally carried out at from 180° to 280° C., preferably from 200° to 240° C., under a pressure of from 10 to 250 bar. A continuous embodiment in which the mixing is carried out in a conventional single-screw or twin-screw extruder is preferred. The mixture is then let down to atmospheric pressure, advantageously by extrusion though a die, and the blowing agent evaporates and the styrene polymer expands. The resulting foam has a circular or rectangular cross-section, depending on the shape of the die, and stabilizes on cooling.

The foams produced according to the invention possess a very fine, uniform cell structure, with more than 2, preferably more than 4, cells per mm.

In the Examples, parts and percentages are by weight.

EXAMPLE 1

30 g of milled polystyrene were mixed with various nucleating agents, and each mixture was introduced into a 1 l stirred autoclave. $CO_2$ was forced in until a pressure of 40 bar was reached, after which the mixture was heated to 180° C. in the course of 30 minutes, and stirred for a further 30 minutes at a stirrer speed of 400 rpm. Thereafter, the presure was let down while cooling to 115° C. The properties of the resulting foams are given in Table 1.

EXAMPLE 2

Polystyrene, 12% of a mixture of blowing agents comprising 70 parts of dichlorodifluoromethane and 30 parts of methyl chloride, and various nucleating agents were melted in a single-screw extruder, and the melt was extruded through a sheet die. The throughput was 80 kg/hour, and the temperature of the mass in the extruder was 180° C.

The densities and the number of cells per mm were determined for the resulting foams which had dimensions of 60×200 mm (Table 2).

TABLE 1

| Experiment | Metal soap | Amount % | Additive | Amount % | Density g/l | Number of cells per mm$^{-1}$ |
| --- | --- | --- | --- | --- | --- | --- |
| 1 | — | — | — | — | 58 | 0.2 |
| 2 | Ba stearate | 0.1 | — | — | 60 | 4.0 |
| 3 | Ca stearate | 0.1 | — | — | 58 | 1.9 |
| 4 | Ca stearate | 0.1 | talc | 0.4 | 65 | 4.5 |
| 5 | Ca stearate | 0.1 | MgO | 0.4 | 65 | 6.0 |
| 6 | Ca stearate | 0.1 | $SiO_2$ | 0.4 | 67 | 5.0 |
| 7 | Ca Laurate | 0.5 | ZnO | 0.1 | 62 | 5.0 |

The nucleating agents had the following mean particle sizes:
Ba stearate: 10 μm    Ca stearate: 15 μm
Talc: 30 μm    MgO: 10 μm TABLE 1-continued

| Experiment | Metal soap | Amount % | Additive | Amount % | Density g/l | Number of cells per mm$^{-1}$ |
|---|---|---|---|---|---|---|
| SiO$_2$: | 4 μm | | ZnO: | 15 μm | | |

TABLE 2

| Experiment | Metal soap | Amount % | Additive | Amount % | Density g/l | Number of cells per mm$^{-1}$ |
|---|---|---|---|---|---|---|
| 1 | — | — | — | — | 33.8 | 0.3 |
| 2 | Ca stearate | 0.6 | — | — | 35.8 | 2.4 |
| 3 | Ca stearate | 0.6 | MgO | 0.1 | 37.3 | 9.5 |
| 4 | Ca Laurate | 0.3 | MgO | 0.1 | 36.2 | 6.5 |

We claim:

1. A process for the production of a foam by melting a styrene polymer, mixing the melt with a volatile blowing agent and a nucleating agent under superatmospheric pressure, letting the mixture down to atmospheric pressure, and cooling the foam, wherein from 0.02 to 2% by weight of the calcium salt of a long chain fatty acid, and from 0.01 to 1% by weight of a finely divided, inorganic substance having a mean pratical size of from 0.01 to 200 μm and selected from the group consisting of magnesium oxide, zinc oxide, aluminum oxide, talc, silica or chalk, said inorganic substance being insoluble in the styrene polymer, are employed as the nucleating agent, the percentages being based on the styrene polymer.

2. A process as claimed in claim 1, wherein the calcium salt is calcium stearate or calcium laurate.

3. A process as claimed in claim 1, wherein mixing is carried out continuously in an extruder.

4. A process as claimed in claim 1 wherein the finely divided, inorganic substance is magnesium oxide.

* * * * *